(12) United States Patent
Huang et al.

(10) Patent No.: US 8,238,444 B2
(45) Date of Patent: Aug. 7, 2012

(54) PERCEPTUAL-BASED VIDEO CODING METHOD

(75) Inventors: Yi-Hsin Huang, Taipei (TW); Tao-Sheng Ou, Taipei (TW); Homer H. Chen, Taipei (TW)

(73) Assignee: National Taiwan University, Taipei (TW)

( * ) Notice: Subject to any disclaimer, the term of this patent is extended or adjusted under 35 U.S.C. 154(b) by 323 days.

(21) Appl. No.: 12/638,981

(22) Filed: Dec. 15, 2009

(65) Prior Publication Data
US 2011/0142124 A1 Jun. 16, 2011

(51) Int. Cl.
*H04N 11/04* (2006.01)
(52) U.S. Cl. .......... 375/240.27; 375/240.02; 375/240.26
(58) Field of Classification Search ............. 375/240.27, 375/240.02, 240.26
See application file for complete search history.

(56) References Cited

U.S. PATENT DOCUMENTS

| | | | |
|---|---|---|---|
| 7,042,943 B2 * | 5/2006 | Haskell et al. | 375/240.03 |
| 7,308,146 B2 * | 12/2007 | Becker et al. | 382/233 |
| 7,742,643 B2 * | 6/2010 | Yang et al. | 382/232 |
| 7,876,819 B2 * | 1/2011 | Wang et al. | 375/240.03 |
| 2007/0009026 A1 * | 1/2007 | Kwon et al. | 375/240.03 |
| 2008/0084929 A1 * | 4/2008 | Li | 375/240.12 |
| 2008/0279466 A1 * | 11/2008 | Yang | 382/246 |

OTHER PUBLICATIONS

Z. Wang et al., "Video Quality Assessment Based on Structural Distortion Measurement", Signal Processing: Image Communication, vol. 19, No. 1, Jan. 2004 pp. 1-9.*

* cited by examiner

*Primary Examiner* — David Czekaj
*Assistant Examiner* — Jonathan Torchman
(74) *Attorney, Agent, or Firm* — Stout, Uxa, Buyan & Mullins, LLP

(57) ABSTRACT

A perceptual-based video coding method provides a perceptual-based rate-distortion (R-D) curve as a predictive R-D curve. The Lagrange multiplier for a current frame is then determined by deciding a slope, with sign reversed, of a tangent to the predictive R-D curve at a current point that is on the predictive R-D curve and closest to a previous R-D point of a previous encoded frame. The current frame is then encoded according to the determined Lagrange multiplier.

24 Claims, 4 Drawing Sheets

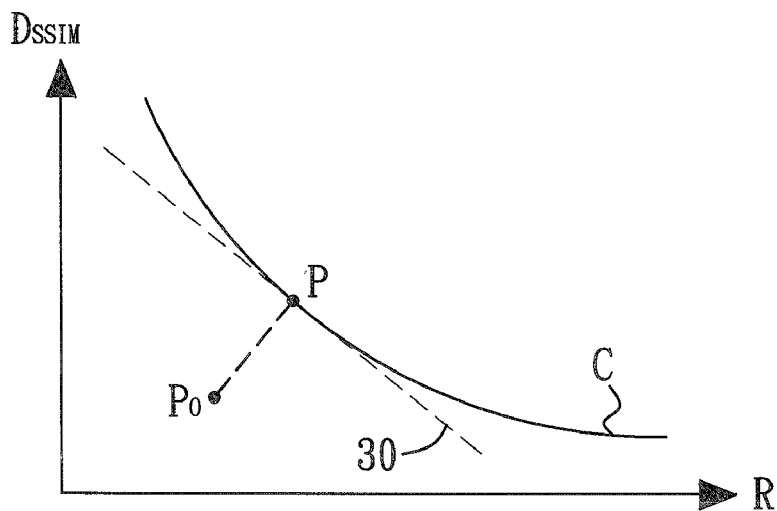

FIG. 3B

```
┌─────────────────────────────────────┐
│ Horizontally and vertically project │─ 41
│   previous point P₀ to R-D curve    │
└─────────────────────────────────────┘
                  │
                  ▼
┌─────────────────────────────────────┐
│ Connect projected points to obtain λ│
│  as the slope, with sign reversed,of│─ 42
│         the connected line          │
└─────────────────────────────────────┘
```

FIG. 4A

PERCEPTUAL-BASED VIDEO CODING METHOD

BACKGROUND OF THE INVENTION

1. Field of the Invention

The present invention generally relates to rate-distortion optimization (RDO) for video coding, and more particularly to a perceptual RDO using structural similarity (SSIM) index as a quality metric.

2. Description of Related Art

The high performance of H.264 video coding is attributed to, among other things, adoption of the rate-distortion optimization (RDO) framework. An objective distortion metric, such as mean square error (MSE), sum of square difference (SSD) or sum of absolute difference (SAD), is conventionally used in the RDO framework. However, these conventional metrics are poorly correlated with perceptual quality because they do not take the characteristics of the human visual system (e.g., visual perception) into account. Further, most conventional video coding systems are disadvantageously designed with such non-perceptual-based metrics.

The object of RDO is to minimize the distortion D at a given rate R by an appropriate selection of the coding modes. The RDO problem is commonly formulated as $$J = D + \lambda R$$

or $$\lambda = -\frac{dD}{dR}$$

where J is a cost function, and $\lambda$ is the Lagrange multiplier that controls the tradeoff between the distortion and the rate.

As the rate-distortion (R-D) characteristic of the video content cannot be obtained until the video is encoded and the video cannot be encoded unless the R-D characteristic is given, the Lagrange multiplier cannot be directly calculated from the above expression. In order to resolve this dilemma, methods have been proposed but, as known to the inventors of the present application, none of them is both content-adaptive and computationally efficient. Furthermore, most of them are not perceptual-based.

For the reason that conventional methods could not effectively and economically obtain the Lagrange multiplier in order to encode the image, a need has arisen to propose a novel scheme for economically determining the Lagrange multiplier in a perceptual-based manner.

SUMMARY OF THE INVENTION

In view of the foregoing, it is an object of the embodiments of the present invention to provide a perceptual-based video coding method adopting perceptual-based rate-distortion optimization (RDO), which is more adaptive to content as compared to the conventional methods.

According to one embodiment, a frame is received followed by determining whether it is a key frame. When the received frame is determined to be a key frame, the key frame is encoded using a non-perceptual-based (e.g., MSE-based) rate distortion optimization (RDO) for at least two different quantization parameters (QPs), therefore obtaining at least two R-D points. Subsequently, the two R-D points are fit to provide a perceptual-based (e.g., SSIM-based) rate-distortion (R-D) curve as a predictive R-D curve. When the received frame is determined as a non-key frame, a previous R-D point is obtained according to an encoded previous frame. The Lagrange multiplier for the current non-key frame is then determined by deciding a slope, with sign reversed, of a tangent to the predictive R-D curve at a current point that is on the predictive R-D curve and closest to the previous R-D point. The current non-key frame is then encoded according to the determined Lagrange multiplier.

BRIEF DESCRIPTION OF THE DRAWINGS

FIG. 3B shows an exemplary R-D curve according to the embodiment of FIG. 3A;

FIG. 4A is a flow diagram that illustrates a method of determining or estimating the Lagrange multiplier for the current frame by slope approximation according to another embodiment of the present invention.

DETAILED DESCRIPTION OF THE INVENTION

Figure 1:
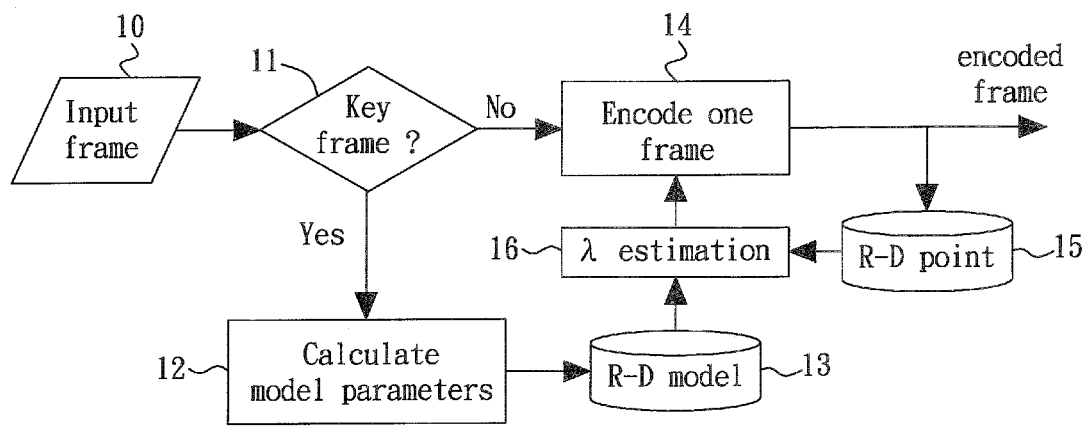
FIG. 1 shows a block diagram of perceptual-based video coding according to one embodiment of the present invention.

FIG. 1 shows a block diagram of perceptual-based video coding according to one embodiment of the present invention. The embodiment adopts perceptual-based rate-distortion optimization (RDO), and may be applied, but is not limited, to H.264 intra-frame coding, e.g., cf. JM reference software. In the embodiment, a perceptual-based quality metric such as, but not limited to, the structural similarity (SSIM) index is utilized to measure the structural similarity as well as the luminance and contrast similarity between an original image and a reconstructed image. The more similar two images are, the higher the SSIM index is. In an extreme case, the SSIM index is 1 when the two images are identical. The SSIM is discussed, for example, in a disclosure entitled "Image quality assessment: from error visibility to structural similarity," IEEE Transactions on Image Processing (April 2004), vol. 13, no. 4, pp. 600-612, by Z. Wang et al., the disclosure of which is hereby incorporated by reference. To the contrary, conventional non-perceptual-based metrics such as mean square error (MSE), sum of square difference (SSD) or sum of absolute difference (SAD) are poorly correlated with human perception.

Referring to the embodiment, in block 10, an input frame is received. Subsequently, the input frame is determined, in block 11, as a key frame or a non-key frame. In general, the first frame of a whole video sequence is assigned as a key frame, and the first frame of a sub-sequence in the video sequence is determined or assigned as a key frame. The frames in a sub-sequence may have similar R-D characteristics, and different sub-sequences may have distinct R-D characteristics due, for example to high motion or scene change. Accordingly, the key frame may be periodically or non-periodically renewed.

When the received frame is determined as a key frame, the key frame is then encoded using the MSE-based RDO for at least two different quantization parameters (QPs). As a result, two R-D points (or pairs), $(R_1, D_1)$ and $(R_2, D_2)$, are obtained.

Figure 2:
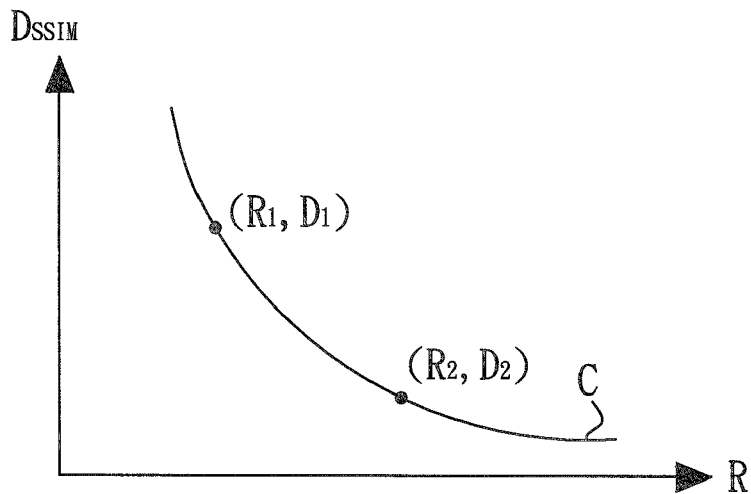
FIG. 2 shows an exemplary R-D curve in the perceptual R-D space.

A curve fit is applied to these two R-D pairs in order to derive an R-D curve. It may be empirically shown that the R-D points may be well fitted (e.g., represented, applied, or approximated) by a power function of the form $D=\alpha R^\beta$, where $\alpha$ and $\beta$ are model parameters (MPs), and $\beta$ is a negative number. Therefore, the power function is used, in the embodiment, to approximate the MSE-based R-D curve in the perceptual R-D space. FIG. 2 shows an exemplary R-D curve C in the perceptual R-D space, in which the horizontal axis represents the average number of bits per frame (i.e., the rate R), and the vertical axis represents the sum of the distortion of each block in a frame (i.e., the perceptual-based distortion $D_{SSIM}$), which may be expressed as follows:

$$D_{SSIM}=1-SSIM.$$

In the embodiment, the model parameters (MPs) may be directly computed, in block 12, from the following equations:

$$\alpha = D_1 \exp\left\{-\frac{\ln(R_1) \times \ln(D_2/D_1)}{\ln(R_2/R_1)}\right\},$$

$$\beta = \frac{\ln(D_2/D_1)}{\ln(R_2/R_1)}.$$

Once the model parameters $\alpha$ and $\beta$ are computed, the R-D model or curve may then be obtained in block 13. The obtained R-D model may be used as a predictive R-D model for the following consecutive frames, which generally have high correlation and hence similar R-D characteristics with the key frame. As discussed above, the key frame may be periodically or non-periodically renewed, and the R-D model may thus be refreshed accordingly.

On the other hand, when the current input frame is determined as a non-key frame in block 11, the non-key frame is then encoded in block 14. Accordingly, a corresponding R-D point may be obtained in block 15.

Afterwards, the Lagrange multiplier $\lambda_{SSIM}$ (abbreviated as $\lambda$) of the current frame may be obtained (e.g., estimated), in block 16, by determining the slope, with sign reversed, of the tangent to the predictive R-D model at the current point that is on the predictive R-D curve and closest to the previous R-D point of the previous coded frame (from block 15). In other words, the Lagrange multiplier $\lambda$ for the current frame may be obtained in a predictive manner by using the R-D model (from block 13) of the previous coded key frame and the previous R-D point of the previous coded frame (from block 15). Details of determining the Lagrange multiplier $\lambda$ for the current frame will be described later. The relationship among the Lagrange multiplier $\lambda_{SSIM}$, the SSIM-based distortion $D_{SSIM}$, and the rate R may be expressed as $$J=D_{SSIM}+\lambda_{SSIM}R$$

where J is, for example, the cost function of a H.264 mode decision.

For monotonic sequences of images (e.g., video conferencing types of sequences) having similar R-D characteristics or for applications that demand light-weight computation, a low-complexity mode is provided. In this mode, blocks 11 and 12 may be omitted. Instead, the R-D model is predetermined beforehand.

Figure 3A:
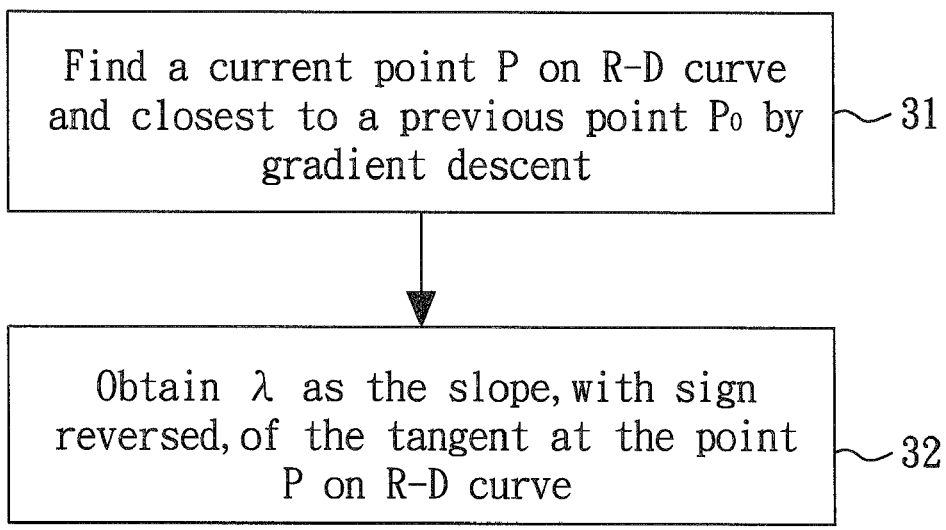
FIG. 3A is a flow diagram that illustrates a method of determining or estimating the Lagrange multiplier for the current frame by gradient descent according to one embodiment of the present invention.

FIG. 3A is a flow diagram that illustrates a method of determining or estimating the Lagrange multiplier $\lambda$ according to one embodiment of the present invention, and FIG. 3B shows an exemplary R-D curve according to the method. In the embodiment, the Lagrange multiplier $\lambda$ is determined or estimated for the current frame by gradient descent at step 31, by finding the current point p that is on the predictive R-D curve and closest to the R-D point $p_0$ of the previous coded frame as shown in FIG. 3B. The finding may be formulated as $$p = \arg\min_{q \in C}(d(p_0, q)),$$

where $d(.,.)$ denotes the 2-norm distance between two points, and C denotes the R-D curve; $d(p_0,q)$ may be expressed as $$d(p_0,q)=\sqrt{(R-R_{prev})^2+(D-D_{prev})^2}=\sqrt{(R-R_{prev})^2+(\alpha R^\beta-D_{prev})^2}$$

where $D_{prev}$ denotes the distortion of the previous coded frame, and $R_{prev}$ denotes the rate of the previous coded frame.

The current point p on the R-D curve may be found by solving the preceding formula by gradient descent. The gradient descent is a first-order optimization algorithm, and it itself is a conventional algorithm. Details of the gradient descent algorithm are thus omitted here for brevity. Once the current point p on the R-D curve is found, the Lagrange multiplier $\lambda_{SSIM}$, which is the slope, with sign reversed, of the tangent 30 (FIG. 3B) at the current point $p=(R_p,D_p)$ on the R-D curve, may thus be obtained, in step 32, according to $D=\alpha R^\beta$ and by the following equation:

$$\lambda_{SSIM} = -\frac{dD}{dR} = -\alpha\beta R^{\beta-1}|_{R=R_p}.$$

It is noted that the gradient descent is an iterative algorithm, and the initial point as required in the gradient descent algorithm may be chosen, in the embodiment, to be the point vertically projected to the R-D curve from the point $p_0$.

Figure 4B:
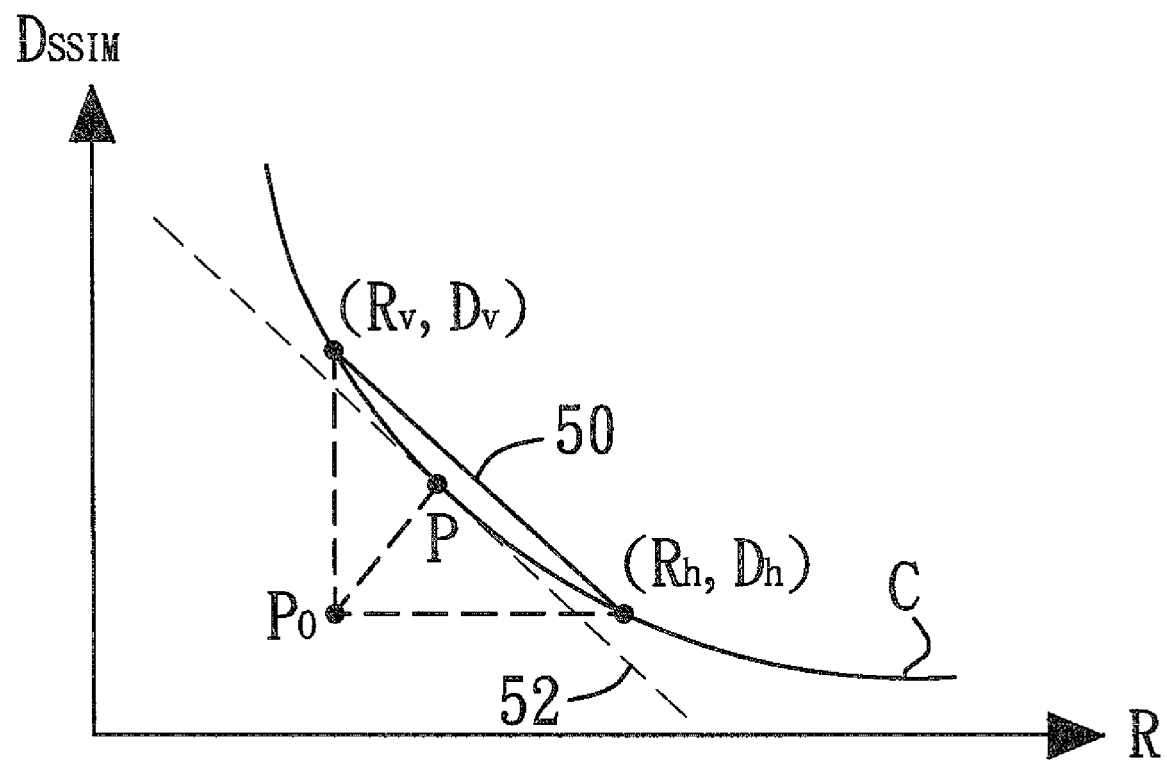
FIG. 4B shows an exemplary R-D curve according to the embodiment of FIG. 4A.

FIG. 4A is a flow diagram that illustrates a method of determining or estimating the Lagrange multiplier $\lambda$ for the current frame by slope approximation according to another embodiment of the present invention. In step 41, the point $p_0$ of the previous coded frame is horizontally projected to the R-D curve C to obtain a projected point $(R_h,D_h)$, and the point $p_0$ is vertically projected to the R-D curve C to obtain a projected point $(R_v,D_v)$ as shown in FIG. 4B. Subsequently, in step 42, a line 50 is formed by connecting the horizontally projected point $(R_h,D_h)$ and the vertically projected point $(R_v,D_v)$. The slope of the line 50 thus formed approximates the slope of the tangent 52 corresponding to the optimal $\lambda$, with sign reversed. The foregoing discussion may be expressed as $$R_v = R_p,$$

$$D_v = \alpha R_p^\beta,$$

$$R_h = \left(\frac{D_p}{\alpha}\right)^{\frac{1}{\beta}},$$

$$D_h = D_p,$$

where $p_0=(R_p,D_p)$.

Therefore, the Lagrange multiplier $\lambda_{SSIM}$ for the current frame may be determined as $$\lambda_{SSIM} = -\frac{D_v - D_h}{R_v - R_h}.$$

It is noted that the present embodiment is an approximation approach. The advantage of this embodiment is simplicity in calculation. As opposed to the gradient descent embodiment, no iteration is required.

It is further noted that the present embodiment is not limited to that illustrated, and a variety of modifications may be made. For example, instead of connecting the horizontally projected point $(R_h, D_h)$ and the vertically projected point $(R_v, D_v)$, the slope at the current point p on the R-D curve may be obtained, in a modified embodiment, by averaging a slope $S_h$ at the horizontally projected point $(R_h, D_h)$ and a slope $S_v$ at the vertically projected point $(R_v, D_v)$:

$$\lambda_{SSIM} = -(S_h + S_v)/2.$$

Generally speaking, the slope at the current R-D point p that is on the R-D curve and closest to the previous R-D point $p_o$ may be estimated according to two or more obtained points on the R-D curve. Accordingly, the Lagrange multiplier λ for the current frame is obtained as the estimated slope with sign reversed.

For the foregoing, the embodiments disclosed herein are more adaptive to content than the conventional methods that determine the Lagrange multiplier according to quantization parameters only. Given a perceptual quality level, the resulting video encoder according to the proposed embodiments may achieve 5%-10% bit rate reduction over, for example, the JM reference software. Subjective evaluation further confirms that, at the same bit-rate, the proposed perceptual RDO preserves image details and prevents block artifact better than the conventional RDO.

Although specific embodiments have been illustrated and described, it will be appreciated by those skilled in the art that various modifications may be made without departing from the scope of the present invention, which is intended to be limited solely by the appended claims.

What is claimed is:

1. A perceptual-based video coding method, comprising: using a processor to perform the steps of:
    providing a perceptual-based rate-distortion (R-D) curve as a predictive R-D curve that describes a relationship between a rate (R) and a perceptual-based distortion (D);
    obtaining a previous R-D point according to an encoded previous frame;
    determining a Lagrange multiplier for a current frame by determining a slope, with sign reversed, of a tangent to the predictive R-D curve at a current point that is on the predictive R-D curve and closest to the previous R-D point; and
    encoding the current frame according to the determined Lagrange multiplier;
    wherein the perceptual-based R-D curve is provided according to the following steps:
    receiving a key frame;
    encoding the key frame using a non-perceptual-based rate distortion optimization (RDO) for at least two different quantization parameters (QPs), therefore obtaining at least two R-D points;
    fitting the at least two R-D points to provide the R-D curve; and
    obtaining at least two model parameters (MPs) associated with the R-D curve.

2. The method of claim 1, wherein the perceptual-based distortion is a structural similarity (SSIM) index-based distortion ($D_{SSIM}$) and is expressed as $$D_{SSIM} = 1 - SSIM.$$

3. The method of claim 1, wherein relationship among the Lagrange multiplier (λ), the distortion (D) and the rate (R) is expressed as $$J = D + \lambda R$$

or $$\lambda = -\frac{dD}{dR},$$

where J is a cost function of a video mode decision.

4. The method of claim 1, wherein the key frame is a first frame of a video sequence.

5. The method of claim 4, wherein the key frame is a first frame of a sub-sequence in the video sequence, and the frames in the sub-sequence have similar R-D characteristics.

6. The method of claim 1, wherein the non-perceptual-based rate distortion optimization (RDO) uses mean square error (MSE) as a distortion metric.

7. The method of claim 1, wherein the at least two R-D points are fit by a power function of a form $$D = \alpha R^\beta,$$

where α and β are the model parameters (MPs), and β is a negative number.

8. The method of claim 7, wherein the model parameters (MPs) α and β are computed from the following equations:

$$\alpha = D_1 \exp\left\{-\frac{\ln(R_1) \times \ln(D_2/D_1)}{\ln(R_2/R_1)}\right\},$$

$$\beta = \frac{\ln(D_2/D_1)}{\ln(R_2/R_1)},$$

where $(R_1, D_1)$ and $(R_2, D_2)$ are the two R-D points.

9. The method of claim 1, wherein the provided perceptual-based R-D curve is predetermined.

10. The method of claim 1, wherein the step of determining the Lagrange multiplier for the current frame is performed according to the following steps:
    finding the current point that is on the predictive R-D curve and closest to the previous R-D point by gradient descent; and
    obtaining the Lagrange multiplier for the current frame as the slope, with sign reversed, of the tangent at the current point on the R-D curve.

11. The method of claim 10, wherein the step of finding the current point p is formulated as $$p = \arg\min_{q \in C}(d(p_0, q)),$$

where d (., .) denotes a 2-norm distance between two points, C denotes the R-D curve, and d ($p_0$, q) is expressed as $$d(p_0, q) = \sqrt{(R - R_{prev})^2 + (D - D_{prev})^2} = \sqrt{(R - R_{prev})^2 + (\alpha R^\beta - D_{prev})^2}$$

where $D=\alpha R^\beta$, $\alpha$ and $\beta$ are model parameters (MPs), and $\beta$ is a negative number, $(R_{prev}, D_{prev})$ is the previous R-D point.

12. The method of claim 11, wherein the Lagrange multiplier $\lambda_{SSIM}$ for the current frame is obtained by the following equation:

$$\lambda_{SSIM} = -\frac{dD}{dR} = -\alpha\beta R^{\beta-1}|_{R=R_p}.$$

13. The method of claim 1, wherein the step of determining the Lagrange multiplier for the current frame is performed according to the following steps:
   obtaining two or more points on the R-D curve according to the previous R-D point; and
   determining a slope of a point that is on the R-D curve and closest to the previous R-D point according to the obtained two or more points on the R-D curve;
   wherein the Lagrange multiplier for the current frame is then obtained as the slope with sign reversed.

14. The method of claim 1, wherein the step of determining the Lagrange multiplier for the current frame is performed according to the following steps:
   projecting the previous R-D point horizontally to the R-D curve along an axis representing the rate (R), therefore obtaining a horizontally projected point;
   projecting the previous R-D point vertically to the R-D curve along an axis representing the distortion (D), therefore obtaining a vertically projected point; and
   connecting the projected points to obtain a connected line;
   wherein the Lagrange multiplier for the current frame is obtained as the slope, with sign reversed, of the connected line.

15. The method of claim 14, wherein the vertically projected point $(R_v, D_v)$ and the horizontally projected point $(R_h, D_h)$ are expressed as $$R_v = R_p,$$
$$D_v = \alpha R_p^\beta,$$
$$R_h = \left(\frac{D_p}{\alpha}\right)^{\frac{1}{\beta}},$$
$$D_h = D_p,$$

where $(R_p, D_p)$ is the previous R-D point.

16. The method of claim 15, wherein the Lagrange multiplier $\lambda_{SSIM}$ for the current frame is obtained by the following equation:

$$\lambda_{SSIM} = -\frac{D_v - D_h}{R_v - R_h}.$$

17. A perceptual-based video coding method, comprising:
   using a processor to perform the steps of:
   receiving a frame;
   determining whether the received frame is a key frame;
   when the received frame is determined as the key frame, encoding the key frame using a non-perceptual-based rate distortion optimization (RDO) for at least two different quantization parameters (QPs), therefore obtaining at least two R-D points, wherein the non-perceptual-based rate distortion optimization (RDO) uses mean square error (MSE) as a distortion metric;
   fitting the at least two R-D points to provide a perceptual-based rate-distortion (R-D) curve as a predictive R-D curve that describes relationship between a rate (R) and a perceptual-based distortion (D), wherein at least two model parameters (MPs) associated with the R-D curve are obtained, wherein the perceptual-based distortion is a structural similarity (SSIM) index-based distortion $(D_{SSIM})$ and is expressed as $D_{SSIM}=1-SSIM$;
   when the received frame is determined as a non-key frame, obtaining a previous R-D point according to an encoded previous frame;
   determining a Lagrange multiplier for a current frame by determining a slope, with sign reversed, of a tangent to the predictive R-D curve at a current point that is on the predictive R-D curve and closest to the previous R-D point; and
   encoding the current frame according to the determined Lagrange multiplier.

18. The method of claim 17, wherein the key frame is a first frame of a video sequence, or a first frame of a sub-sequence in the video sequence, and wherein the frames in the sub-sequence have similar R-D characteristics.

19. The method of claim 17, wherein the at least two R-D points are fit by a power function of a form $$D=\alpha R^\beta,$$

where $\alpha$ and $\beta$ are the model parameters (MPs), and $\beta$ is a negative number.

20. The method of claim 17, wherein the step of determining the Lagrange multiplier for the current frame is performed according to the following steps:
   finding the current point that is on the predictive R-D curve and closest to the previous R-D point by gradient descent; and
   obtaining the Lagrange multiplier for the current frame as the slope, with sign reversed, of the tangent at the current point of the R-D curve.

21. The method of claim 20, wherein the step of finding the current point p is formulated as $$p = \arg\min_{q \in C}(d(p_0, q)),$$

where $d(.,.)$ denotes a 2-norm distance between two points, C denotes the R-D curve, and $d(p_0, q)$ is expressed as $$d(p_0, q) = \sqrt{(R-R_{prev})^2 + (D-D_{prev})^2} = \sqrt{(R-R_{prev})^2 + (\alpha R^\beta - D_{prev})^2}$$

where $D=\alpha R^\beta$, $\alpha$ and $\beta$ are model parameters (MPs), and $\beta$ is a negative number, $(R_{prev}, D_{prev})$ is the previous R-D point;
   wherein the Lagrange multiplier $\lambda_{SSIM}$ for the current frame is obtained by the following equation:

$$\lambda_{SSIM} = -\frac{dD}{dR} = -\alpha\beta R^{\beta-1}|_{R=R_p}.$$

22. The method of claim 17, wherein the step of determining the Lagrange multiplier for the current frame is performed according to the following steps:
   obtaining two or more points on the R-D curve according to the previous R-D point; and determining a slope of a point that is on the R-D curve and closest to the previous R-D point according to the obtained two or more points on the R-D curve;
wherein the Lagrange multiplier for the current frame is obtained as the slope with sign reversed.

23. The method of claim 17, wherein the step of determining the Lagrange multiplier for the current frame is performed according to the following steps:
projecting the previous R-D point horizontally to the R-D curve along an axis representing the rate (R), therefore obtaining a horizontally projected point;
projecting the previous R-D point vertically to the R-D curve along an axis representing the distortion (D), therefore obtaining a vertically projected point; and
connecting the projected points to obtain a connected line;
wherein the Lagrange multiplier for the current frame is obtained as the slope, with sign reversed, of the connected line.

24. The method of claim 23, wherein the vertically projected point $(R_v, D_v)$ and the horizontally projected point $(R_h, D_h)$ are expressed as $$R_v = R_p,$$

$$D_v = \alpha R_p^\beta,$$

$$R_h = \left(\frac{D_p}{\alpha}\right)^{\frac{1}{\beta}},$$

$$D_h = D_p,$$

where $(R_p, D_p)$ is the previous R-D point;
wherein the Lagrange multiplier $\lambda_{SSIM}$ for the current frame is obtained by the following equation:

$$\lambda_{SSIM} = -\frac{D_v - D_h}{R_v - R_h}.$$

* * * * *